United States Patent
Guo et al.

(10) Patent No.: US 6,975,482 B1
(45) Date of Patent: Dec. 13, 2005

(54) SETTLE CONTROL SYSTEMS AND METHODS FOR THE SECOND STAGE OF A DUAL STAGE ACTUATOR

(75) Inventors: Lin Guo, Milpitas, CA (US); Xiaoping Hu, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/794,579

(22) Filed: Mar. 5, 2004

Related U.S. Application Data

(60) Provisional application No. 60/452,612, filed on Mar. 6, 2003.

(51) Int. Cl.[7] .............................................. G11B 5/55
(52) U.S. Cl. .................................................. 360/78.05
(58) Field of Search ...................................... 360/78.05

(56) References Cited

U.S. PATENT DOCUMENTS

| | | | | |
|---|---|---|---|---|
| 5,177,652 A | * | 1/1993 | Yamaguchi et al. ...... | 360/78.05 |
| 6,005,742 A | * | 12/1999 | Cunningham et al. ... | 360/78.05 |
| 6,088,187 A | * | 7/2000 | Takaishi .................. | 360/78.05 |
| 6,424,486 B2 | * | 7/2002 | Heaton et al. ........... | 360/78.05 |
| 6,747,836 B2 | * | 6/2004 | Stevens et al. .......... | 360/78.05 |
| 2003/0197972 A1 | * | 10/2003 | Morris ..................... | 360/78.05 |

* cited by examiner

*Primary Examiner*—David Hudspeth
*Assistant Examiner*—James L Habermehl
(74) *Attorney, Agent, or Firm*—Tejpal S. Hansra

(57) ABSTRACT

An actuator control system and method for a hard disk drive comprising first and second actuators that support a head relative to a disk is disclosed. The actuator control system comprises a first stage, a second stage, a memory device, and a maximum stroke calculator. The first stage displaces the first actuator relative to the disk. The second stage displaces the second actuator relative to the first actuator. The memory device stores at least one data value indicative of a predicted response of the second stage. The maximum stroke calculator generates a predicted maximum stroke based on the at least one data value stored by the memory device. The second stage is deactivated when the disk drive initiates a seek operation. The second stage is reactivated based on a comparison of the predicted maximum stroke with a position of the second actuator.

69 Claims, 6 Drawing Sheets

SETTLE CONTROL SYSTEMS AND METHODS FOR THE SECOND STAGE OF A DUAL STAGE ACTUATOR

RELATED APPLICATIONS

Priority is claimed from U.S. Provisional Patent Application Ser. No. 60/452,612 filed on Mar. 6, 2003, which is incorporated by reference in its entirety.

FIELD OF THE INVENTION

The present invention relates to digital storage devices and, more particularly, to dual stage actuator systems for hard disk drives.

BACKGROUND OF THE INVENTION

A disk drive is a digital data storage device that stores information on concentric tracks on a storage disk. The storage disk is coated on one or both of its primary surfaces with a magnetic material that is capable of changing its magnetic orientation in response to an applied magnetic field. During operation of a disk drive, the disk is rotated about a central axis at a constant rate. To read data from or write data to the disk, a magnetic transducer (or head) is positioned above (or below) a desired track of the disk while the disk is spinning.

Writing is performed by delivering a polarity-switching write current signal to the magnetic transducer while the transducer is positioned above (or below) the desired track. The write signal creates a variable magnetic field at a gap portion of the magnetic transducer that induces magnetically polarized transitions on the desired track. The magnetically polarized transitions are representative of the data being stored.

Reading is performed by sensing the magnetically polarized transitions on a track with the magnetic transducer. As the disk spins below (or above) the transducer, the magnetically polarized transitions on the track induce a varying magnetic field into the transducer. The transducer converts the varying magnetic field into a read signal that is delivered to a preamplifier and then to a read channel for appropriate processing. The read channel converts the read signal into a digital signal that is processed and then provided by a controller to a host computer system.

When data is to be written to or read from the disk, the transducer must be moved radially relative to the disk to a desired track. In a seek mode, the transducer is moved radially inwardly or outwardly to arrange the transducer above the desired track. In an on-track mode, the transducer reads data from or writes data to the desired track. The tracks are typically not completely circular. Accordingly, in the on-track mode the transducer must be moved radially inwardly and outwardly to ensure that the transducer is in a proper position relative to the desired track. The movement of the transducer in on-track mode is referred to as track following.

Modern hard disk drives may employ a dual-actuator system for moving the transducer radially relative to the disk. A first stage of a dual-actuator system is optimized for moving the transducer relatively large distances. A second stage of a dual-actuator system is optimized for moving the transducer relatively small distances. The present invention relates to hard disk drives having dual-stage actuator systems.

FIG. 1 depicts a disk drive 10 comprising control electronics typically including a preamplifier, a read/write channel, a servo control unit, a random access memory (RAM), and a read only memory (ROM), spindle motor and VCM controller driving electronics. The preamplifier, read/write channel, servo control unit, RAM, and ROM are or may be conventional and will not be described herein beyond what is necessary for a complete understanding of the present invention.

FIG. 1 shows that the disk drive 10 includes a disk 12, a spin motor 14, and a base plate 16. The disk 12 is rotated by a spin motor 14, and the spin motor 14 is mounted to a base plate 16. The disk drive 10 includes at least one and typically a plurality of disks 12, each with one or two recording surfaces. During use, the disk 12 is rotated about a spindle axis A shown in FIG. 2.

The disk drive 10 further comprises what is commonly referred to as a head 18. The head 18 comprises or supports the magnetic read/write transducer described above and will thus be referred to herein as the component of the disk drive 10 that reads data from and writes data to the disk 12.

FIGS. 1 and 2 further illustrate a positioning system 20 of the disk drive 10. The positioning system 20 comprises a bearing assembly 22 that supports at least one actuator arm assembly 24. The actuator arm assembly 24 supports the head 18 adjacent to one recording surface 26 of one of the disks 12. Typically, the bearing assembly 22 will support one actuator arm assembly 24 and associated head 18 adjacent to each of the recording surfaces 26 of each of the disks 12. The actuator arm assemblies 24 allow each head 18 to be moved as necessary to seek to a desired track 28 in seek mode and then follow the desired track 28 in track following mode.

The exemplary positioning system 20 depicted in FIGS. 1 and 2 is a dual-stage system. Accordingly, each actuator arm assembly 24 comprises a first actuator 30 and a second actuator 32. The principles of the present invention are currently of primary importance when applied to the second actuator of a dual-stage actuator system, and that application of the present invention will be described herein.

For ease of illustration, FIGS. 1 and 2 depict the first and second actuators 30 and 32 as comprising elongate arms 34 and 36, respectively, and the actuators 30 and 32 may be implemented as shown in FIGS. 2 and 3. Conventionally, the bearing assembly 22 is also considered part of the first actuator 30.

As perhaps best shown in FIG. 2, the bearing assembly 22 supports a proximal end 40 of the arm 34 of the first actuator 30 for rotation about a first axis B, while a distal end 42 of the first actuator arm 34 supports a proximal end 44 of an arm 36 of the second actuator 32 for rotation about a second axis C. In this case, the head 18 is supported on a distal end 46 of the second actuator arm 36.

The actuators 30 and 32 may, however, be implemented using other structures or combinations of structures. For example, the first actuator 30 may comprise an elongate arm that rotates about a first axis B, while the second actuator 32 may comprise a suspension assembly rigidly connected to a distal end of the first actuator. In this case, the first actuator is able to rotate about an actuator axis, while the head 18 would be suspended from the second actuator for linear movement along the disk radius relative to the position of the first actuator. The actuators 30 and 32 may thus take any number of physical forms, and the scope of the present invention should not be limited to the exemplary actuators 30 and 32 depicted in FIGS. 2 and 3 and described herein.

FIG. 2 also illustrates that the exemplary actuators 30 and 32 of the positioning system 20 further comprise a first electromechanical transducer 50 and a second electromechanical transducer 52. In response to a first control signal, the first transducer 50 moves the first actuator arm 34 to change an angular position of the head 18 relative to the first axis B. The second transducer 52 is supported by the distal end 42 of the first actuator 30 to rotate the head 18 about the second axis C in response to a second control signal. The first transducer 50 may be a voice coil motor (VCM), while the second transducer 52 may be a piezo-electric transducer (PZT), but other types of transducers may be used as the first and second transducers 50 and 52.

In FIG. 2, an angular position of the first actuator arm 34 relative to the first axis B is represented by reference character D, while an angular position of the second actuator arm 36 relative to the second axis C is represented by reference character E. When the head 18 is above the neutral position D (on-track mode), the displacement of the second actuator arm 36 is zero.

FIG. 2 also shows that a range of movement utotal is associated with the second actuator 36 relative to a neutral position D defined by the first actuator arm 34. The stroke of the actuator arm 36 in either direction from the neutral position will be referred to herein as umax. The terms u$^+$max and u$^-$max used in FIG. 2 indicate the direction of the stroke with respect to the neutral position D.

An actual position uA of the second stage actuator 32 corresponds to the angular position of the second actuator 32 relative to the neutral position D at any point in time. An initial offset uO of the second stage actuator 32 is the actual position signal uA of the second stage actuator 32 at the time a seek operation is initiated. The terms uO+ and uO− will be used to identify not only the magnitude but also the direction of the initial offset.

FIG. 2 further identifies arbitrary first and second tracks 28$a$ and 28$b$ on the disk 12. The actuator arm assembly 24 is shown in an initial position by solid lines and in a target position by broken lines; the first track 28$a$ will thus be referred to as the "initial track" and the second track 28$b$ will be referred to as the "target track". It should be understood that the terms "initial track" and "target track" are relative to the position of the head 18 before and after a seek operation. Any track 28 on the disk 12 may be considered the initial track or the target track depending upon the state of the disk drive 10 before and after a particular seek operation.

FIG. 3 contains a block diagram of a servo system 60 incorporating a conventional two-stage actuator system. The servo system 60 will typically be embodied as a software program running on a digital signal processor, but one of ordinary skill in the art will recognize that control systems such as the servo system 60 described herein could be implemented in other forms such as using discrete hardware components.

The servo system 60 comprises a first stage servo 62 and a second stage servo 64. As described above, the disk 12 defines a plurality of tracks 28 in the form of generally concentric circles centered about a spindle axis C. The first stage servo 62 controls the first transducer 50 and the second stage servo 64 controls the second transducer 52 to support the head 18 adjacent to a desired one of the tracks 28. The first and second actuator control signals are generated as part of this larger servo system 60.

More specifically, an input signal R is combined with a position error signal PES by a first summer 70. The second stage position signal Y$_2$ is indicative of an actual position signal uA of the transducer 52 of the second stage servo 64, and a second stage position estimate signal Y$_{2est}$ is indicative of an estimated position of the transducer 52 of the second stage servo 64. The second summer 72 combines the second stage position estimate signal Y$_{2est}$ and the output of the first summer 70. A first stage position signal Y$_1$ is indicative of the actual position signal uA of the first transducer 50 of the first stage servo 62. A third summer 74 combines the first and second stage position signals Y$_1$ and Y$_2$. System disturbances d are represented as an input to the third summer 74. The position error signal PES thus represents the combination of the first and second position signals Y$_1$ and Y$_2$ with any system disturbances d.

The sources of the input signal R and the first and second stage position signals Y$_1$ and Y$_2$ are or may be conventional and will be described herein only to the extent necessary for a complete understanding of the present invention. Briefly, each of the tracks 28 includes data sectors having stored data and servo sectors having servo data. The servo data identifies each individual track 28 to assist in seek operations and is also configured to allow adjustment of the radial position of the head 18 during track following. A servo demodulation unit generates the position error signal PES and the first and second stage position signals Y$_1$ and Y$_2$ based on the servo data read from the disk 12. The input signal R is generated by a host computer or is simply zero during track following.

The seek operation may be divided into a seek phase and a settle phase. During the seek phase, the servo system 60 displaces the head 18 most of the distance from the initial track 28$a$ to the target track 28$b$.

During the settle phase, the second stage servo 64 is conventionally deactivated, and the head 18 repeatedly crosses over the target track 28$b$ as the relatively low bandwidth first stage servo 62 of the servo system 60 attempts to lock onto the desired track 28$b$. The second stage servo 64 is typically deactivated while the disk drive 10 performs a seek operation because the stroke S of the second stage servo 64 is too limited to have any significant effect during the seek phase of a seek operation.

Once the seek portion of the seek operation is completed, however, the relatively high bandwidth second stage servo 64 would ideally be activated to speed up the settle phase of the seek operation.

The fundamental problem with using the second stage servo 64 to assist during the settle phase of the seek operation is when to deactivate and reactivate the second stage actuator. The conventional method is to set the actuator 64 to the neutral position at the beginning of the seek operation, deactivate the actuator 64, and then reactivate the actuator 64 when the position error signal PES equals zero.

The conventional method of improving settle times using the second stage servo 64 creates several problems. First, the first stage servo 62 takes too long to lock onto the desired track to place the system 10 in track following mode. The second stage servo 64 would ideally be activated earlier in the seek operation to assist the actuator system 60 in finding the desired track. Second, the second stage servo 64 may be significantly offset from the neutral position (out of stroke) when it is determined that the system is on-track. In this case, the second stage servo 64 may saturate and will thus be unable to cancel out displacement of the first stage servo 62, which may not yet have settled. As a result of this post-settle saturation, a bump in the position error signal PES may occur.

The need thus exists for improved systems and methods of controlling the second stage of a dual stage actuator during the settle phase of a seek operation.

SUMMARY OF THE INVENTION

The present invention may be embodied as an actuator control system for a hard disk drive comprising first and second actuators that support a head relative to a disk. The actuator control system comprises a first stage, a second stage, a memory device, and a maximum stroke calculator. The first stage displaces the first actuator relative to the disk. The second stage displaces the second actuator relative to the first actuator. The memory device stores at least one data value indicative of a predicted response of the second stage. The maximum stroke calculator generates a predicted maximum stroke based on the at least one data value stored by the memory device. The second stage is deactivated when the disk drive initiates a seek operation. The second stage is reactivated based on a comparison of the predicted maximum stroke with a position of the second actuator.

DETAILED DESCRIPTION OF THE PREFERRED EMBODIMENT

Figure 4:
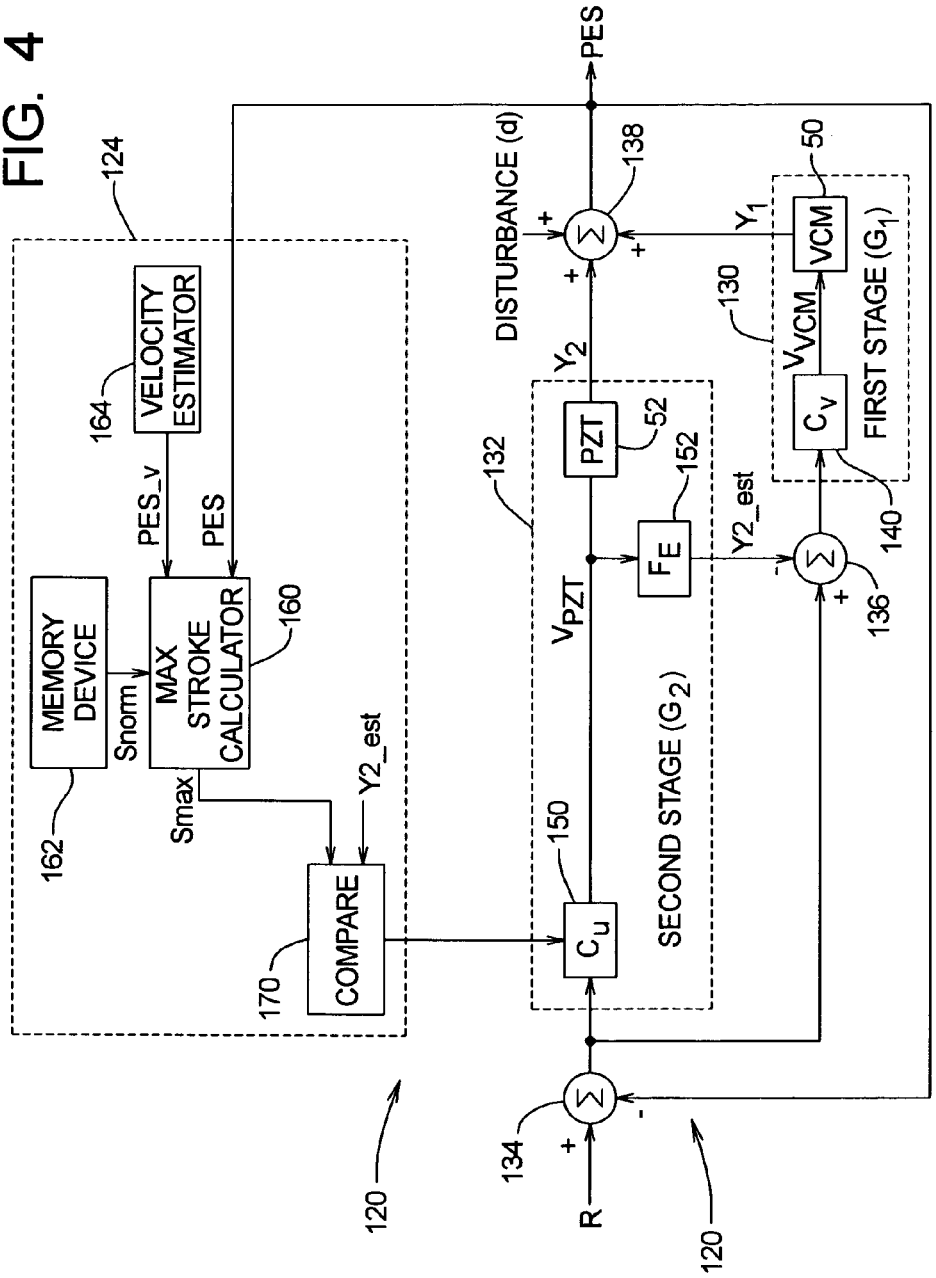
FIG. 4 is a block diagram depicting a first embodiment of a dual-stage actuator of a hard drive containing a settle control system of the present invention.

Referring now to FIG. 4 of the drawing, depicted therein is an actuator control system 120 constructed in accordance with, and embodying, the principles of the present invention. The actuator control system 120 comprises a servo system 122 and a settle control system 124. The actuator control system 120 forms part of a two-stage actuator system similar to the two-stage actuator system formed by the servo system 60 described above.

The servo system 122 will typically be embodied as a software program running on a digital signal processor, but one of ordinary skill in the art will recognize that the servo system 122 described herein could be implemented in hardware. The example servo system 122 comprises a first stage 130, a second stage 132, and first, second, and third summers 134, 136, and 138. The first stage 130 comprises a first control circuit 140 and the first transducer 50 described above. The second stage 132 comprises a second control circuit 150, an estimator circuit 152, and the second transducer 52 described above.

As with the conventional servo system 60 described above, an input signal R is combined with a position error signal PES by the first summer 134. The first control circuit 140 generates a first control signal $V_{VCM}$ for operating the first transducer 50 based on the output of the first summer 134 and a second stage position estimate signal Y2_est. A first stage position signal $Y_1$ is indicative of the actual position of first transducer 50 of the first stage 130.

When activated, the second control circuit 150 generates a second control signal $V_{PZT}$ that controls the second transducer 52 based on the output of the first summer 134. A second stage position signal $Y_2$ is indicative of an actual position signal uA of the second transducer 50 of the second stage 132. The estimator circuit 152 generates the second stage position estimate signal Y2_est based on the second control signal $V_{PZT}$. The second stage position estimate signal Y2_est is indicative of an estimated position of the second transducer 52 of the second stage 132.

The third summer 138 combines the first and second stage position signals $Y_1$ and $Y_2$. System disturbances d are represented as an additional input to the third summer 138. The position error signal PES thus represents the combination of the first and second position signals $Y_1$ and $Y_2$ with any system disturbances d.

The sources of the input signal R and the first and second stage position signals $Y_1$ and $Y_2$ are or may also be conventional and will be described herein only to the extent necessary for a complete understanding of the present invention. Each of the tracks 28 contains data sectors containing stored data and servo sectors containing servo data. The servo data identifies each individual track 28 to assist in seek operations and is also configured to allow adjustment of the radial position of the head 18 during track following. A servo demodulation unit generates the position error signal PES and the first and second stage position signals $Y_1$ and $Y_2$ based on the servo data read from the disk 12.

Given the foregoing, one of ordinary skill in the art will recognize that the first and second stages 130 and 132 form first and second servo loops.

The settle control system 124 of the actuator control system 120 activates or deactivates the second stage 132 based on pre-calculated data tables and operating conditions before and during the seek operation. More specifically, the settle control system 124 generates at least one predicted maximum stroke S(PES,PES_v)max based on the position error signal PES, an estimate of a radial velocity PES_v of the head 18 during the seek operation, and data tables indicative of overshoot of the head 18 relative to the desired track under expected operating conditions. The predicted maximum stroke S(PES,PES_v)max represents an estimate of the predicted maximum stroke required of the second stage 132 to compensate for the overshoot of the head 18 under a given set of conditions.

In use, the settle control system 124 deactivates the second stage 132 at the start of the seek operation. During the seek operation, the settle control system 124 compares the at least one predicted maximum stroke value S(PES, PES_v)max with the second stage position estimate signal Y2_est. Based on this comparison, the settle control system 124 determines whether the second stage 132 has sufficient stroke to compensate for the expected overshoot. When the comparison indicates that the second stage 132 has sufficient stroke to effectively assist with the settle phase of the seek operation, the second stage 132 is reactivated.

The details of construction and operation of several example implementations the settle control system 124 of the actuator control system 120 will now be described.

Referring initially to FIG. 4, that figure shows that the settle control system 124 comprises a maximum stroke calculator 160, a memory device 162, and a velocity estimator 164. The memory device 162 stores at least one data value or data table from which the normalized predicted maximum stroke Snorm as shown in FIG. 4 may be generated. The velocity estimator 164 generates a velocity estimate signal PES_v. The maximum stroke calculator 160 combines the normalized predicted maximum stroke Snorm with the velocity estimate signal PES_v and the position error signal PES to obtain the predicted maximum stroke Smax.

FIG. 4 and the notation used therein is generalized to apply to any one of a number of settle algorithms that may be implemented by the maximum stroke calculator 160. Several examples of settle algorithms will be described in further detail below.

In the following discussion, the term S(0,1) will be used to refer to the velocity component of the normalized predicted maximum stroke Snorm. Similarly, the term S(1,0) will be used to refer to the position component of the normalized predicted maximum stroke Snorm. In addition, the term S(0,PES_v) may be used to refer to the velocity component of the stroke signal Smax, while the term S(PES, 0) may be used to refer to the position component of the predicted maximum stroke Smax. The predicted maximum stroke Smax may also be referred to in the following discussion as S(PES,PES_v)max.

Because of the nature of the pre-calculated position and velocity response curves, the predicted maximum stroke Smax may be represented as a positive value and a negative value. The notations $S^+$max or $S^+$(PES,PES_V)max will be used to identify the positive value, and the notations $S^-$max or $S^-$(PES,PES_V)max will be used to identify the negative value.

The settle control system 124 further comprises a comparator 170. The comparator 170 deactivates or reactivates the second stage 132 based on a comparison of the predicted maximum stroke S(PES,PES_v)max with the second stage actuator actual displacement value uA. The second stage actuator actual displacement value uA is calculated based on the second stage position estimate signal Y2_est.

Figure 5:
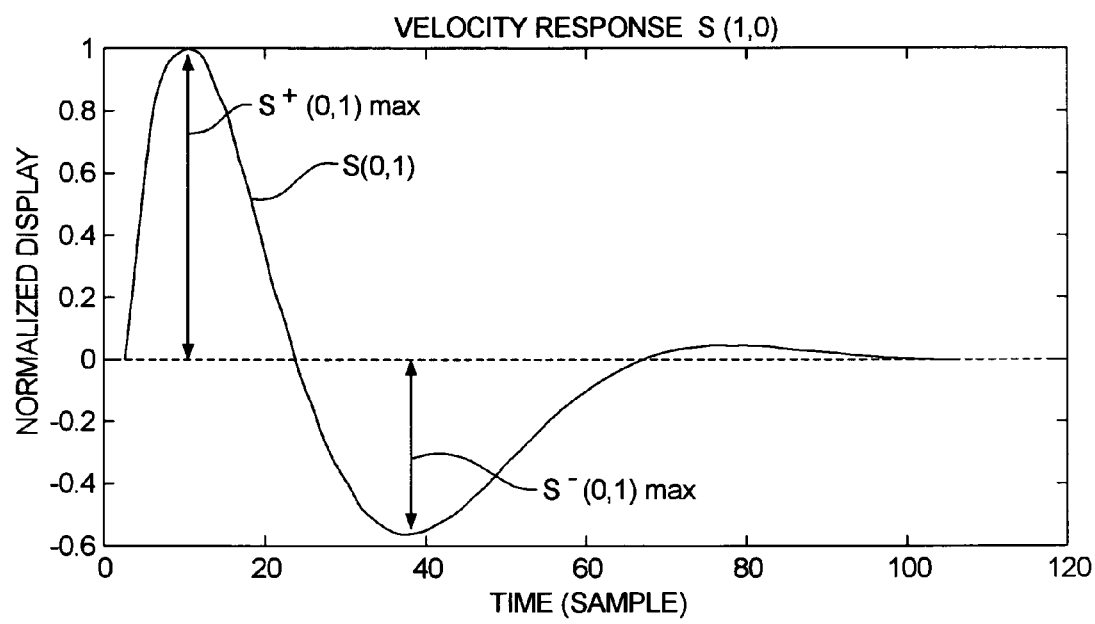
FIGS. 5 and 6 are plots of pre-calculated velocity and position responses over time.
Figure 6:
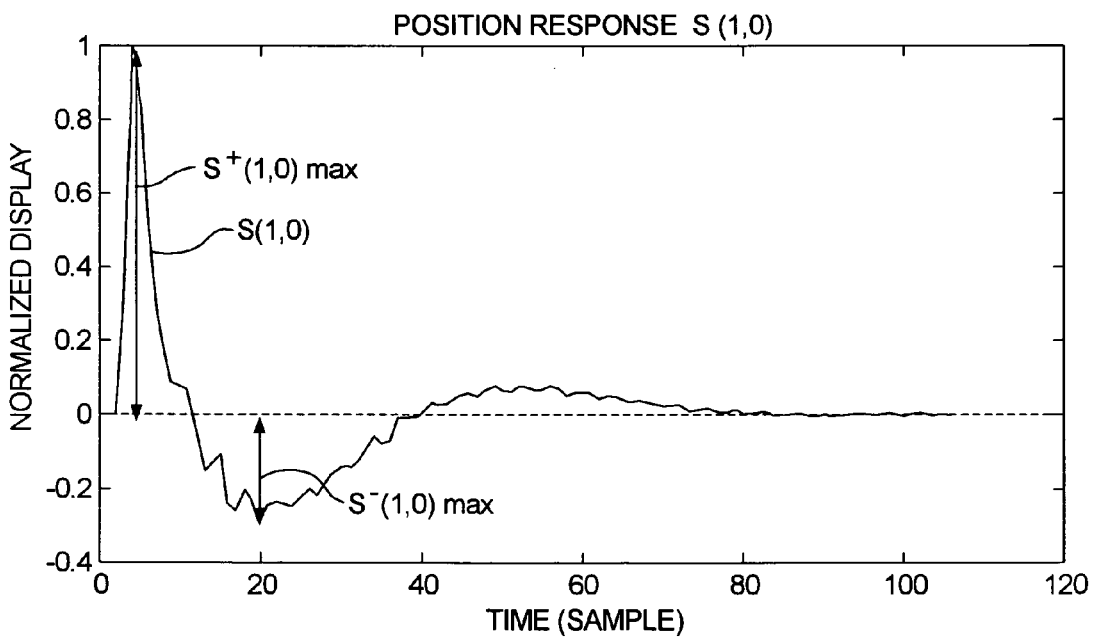

Referring now to FIGS. 5 and 6, depicted therein are plots of normalized velocity and position responses for a particular implementation of the servo system 122. In particular, FIG. 5 contains a trace representing a velocity response signal S(0,1) associated with the servo system 122, while FIG. 6 contains a trace representing a position response signal S(1,0) associated with the servo system 122.

The example signals S(0,1) and S(1,0) represent predicted or pre-calculated overshoot of the servo system 122 resulting from different initial velocity and position states PES_v and PES of the servo system 122 prior to initiation of a seek operation. The signals S(0,1) and S(1,0) represent typical servo loop overshoot in that they each contain an initial peak in one direction and a second peak in the opposite direction before they substantially stabilize at or near zero. The signals S(0,1) and S(1,0) are non-directional in that they are valid in either radial direction of the head 18 relative to the disk 12.

The example signals S(0,1) and S(1,0) are generated based on a simulation of the servo system 122. The signals S(0,1) and S(1,0) may also be generated by actual testing on a design of servo system 122 and/or as part of a calibration process conducted on a particular physical device implementing the servo system 122.

In the following discussion, the maximum value of the initial peak of the signal S(0,1) is referred to as $S^+$(0,1)max, and the maximum value of the second peak of the signal S(0,1) is referred to as $S^-$(0,1)max. Similarly, the maximum value of the initial peak of the trace S(1,0) is referred to as $S^+$(1,0)max, and the maximum value of the second peak of the trace S(1,0) is referred to as S(1,0)max.

The example signals S(0,1) and S(1,0) are normalized such that the peak with the greatest magnitude equals 1.00 on the ordinate axis. In the example signals S(0,1) and S(1,0), the initial peaks are larger than the second peaks. Accordingly, $S^+$(0,1)max and $S^+$(1,0)max are both set equal to 1.00, while $S^-$(0,1)max is approximately 0.55 and $S^-$(1,0)max is approximately 0.30. The signals S(0,1) and S(1,0) are both examples provided for illustrative purposes only, and other servo systems may have different normalization schemes, curves, and/or maximum values.

As will be described in further detail below, the memory device 162 shown in FIG. 4 stores at least one value representing or associated with the velocity and position traces S(0,1) and S(1,0) shown in FIGS. 5 and 6. The normalized predicted maximum stroke Snorm thus comprises at least one value generated from the data stored in the memory device 162 based on one or both of the normalized signals S(0,1) and S(1,0). The example maximum stroke calculator 160 thus also generates the predicted maximum stroke Smax based on the normalized predicted maximum stroke Snorm, the velocity estimate signal PES_v, and the position error signal PES.

The maximum stroke calculator 160 generates the predicted maximum stroke S(PES,PES_v)max using any one of a number of settle algorithms. Three possible settle algorithms for computing the predicted maximum stroke S(PES,PES_v)max will now be discussed.

The first settle algorithm calculates S(PES,PES_v)max based on the absolute value of the sum of the maximums of the signals S(0,1) and S(1,0) in positive and negative directions. In particular, the memory device 162 stores the values of $S^+$(0,1)max, $S^+$(1,0)max, $S^-$(0,1)max, and $S^-$(1,0)max. The velocity estimate signal PES_v is multiplied by the values of $S^+$(0,1)max and $S^-$(0,1)max to obtain $S^+$(0, PES_v)max and $S^-$(0,PES_v)max, respectively. Similarly, the position error signal PES is multiplied by the values of $S^+$(1,0)max and $S^-$(1,0)max to obtain $S^+$(PES,0)max and $S^-$(PES,0)max, respectively.

The maximum stroke calculator 160 thus calculates the predicted maximum stroke values $S^+$(PES,PES_v)max and $S^-$(PES,PES_v)max according to the following equations E1-1 and E1-2:

$$S^+(PES,PES\_v)\text{max} = |S(PES,0)\text{max}| + |S(0,PES\_v)\text{max}| \quad \text{(E1-1)}$$

$$S^-(PES,PES\_v)\text{max} = |S(PES,0)\text{max}| + |S(0,PES\_v)\text{max}| \quad \text{(E1-2)}$$

The comparator 170 turns on the second stage 132 according to the following conditional statement CS1:

if $|S^+(PES,PES\_v)\text{max} + uO^+| < u\text{max}$, and if $|S^-(PES,PES\_v)\text{max} + uO^-| < u\text{max}$, then  (CS1)

activate the second stage 132.

The steps associated with equations E1-1 and E1-2 and conditional statement CS1 are repeated from the time the seek operation is initiated and the second stage actuator is deactivated until the second stage 132 is reactivated.

This first settle algorithm will improve the settle phase of a seek operation. Further, because it is generated only based on the values S(PES,0)max and S(0,PES_v)max, the first settle algorithm is simple to implement.

However, the first settle algorithm may be too conservative in some cases because it assumes a worst case scenario that is unlikely to occur during actual operation of a disk drive employing the servo system 122. In particular, a comparison of the example traces S(0,1) and S(1,0) in FIGS. 5 and 6 shows that the maximum S(1,0)max of the position trace S(1,0) occurs earlier in time than the maximum S(0,1)max of the velocity trace S(0,1). Because the peaks of the traces S(1,0) and S(0,1) do not occur at the same time, S(PES,PES_v)max calculated as described in formula (1) above will likely be significantly greater than the overshoot possible given the parameters of the servo system 122. The result of combining the peaks of the traces S(1,0) and S(0,1) is a possibly significant delay in the reactivation of the second stage 132.

A second settle algorithm calculates S(PES,PES_v)max based on knowledge of the transfer function of the servo system 122. In particular, the transfer function from initial PES to PES is $G_{y\_}{}^{v0}(s)$, and the transfer function from initial velocity to PES is $G_{y\_}{}^{v0}(s)$. It has been proven that $G_{y\_}{}^{v0}(s)=s\,G_{y\_}{}^{v0}(s)$. Therefore, the combined response due to initial velocity and position may be predicted as the vector sum of two vectors with a 90 degree phase difference between them.

Accordingly, the memory device 162 stores the values of $S^+(0,1)$max, $S^+(1,0)$max, $S^-(0,1)$max, and $S^-(1,0)$max, and the second settle algorithm calculates S(PES,PES_v)max according to the following equation E2-1 and E2-2:

$$S^+(PES,PES\_v)\text{max}=sqrt(S^+(PES,0)\text{max}^2+S^+(0,PES\_v)\text{max}^2) \quad \text{(E2-1)}$$

$$S^-(PES,PES\_v)\text{max}=sqrt(S^-(PES,0)\text{max}^2+S^-(0,PES\_v)\text{max}^2) \quad \text{(E2-2)}$$

The comparator 170 then turns on the second stage 132 according to the following conditional statement CS2:

if $|S^+(PES,PES\_v)\text{max}+uO^+|<umax$, and if $|S^-(PES,PES\_v)\text{max}+uO^-|<umax$, then  (CS2)

activate the second stage 132.

The steps associated with equations E2-1 and E2-3 and conditional statement CS2 are repeated from the time the seek operation is initiated and the second stage actuator is deactivated until the second stage 132 is reactivated.

This second settle algorithm is, like the first settle algorithm, based only on S(PES,0)max and S(0,PES_v)max and is thus simple to implement. The second settle algorithm is also less conservative than the first settle algorithm.

One drawback of the second settle algorithm is that it is based on the assumption that the closed loop response can be approximated as a sine wave signal. In addition, the assumption that a 90 degree phase difference exists is only valid for steady state conditions. If the closed loop dynamics are not dominated by a pair of poles and/or the poles are well damped, the prediction of overshoot obtained from equations 2-1 and 2-2 may not be accurate.

A third settle algorithm that may be used by the system of the present invention employs the entire traces of the position response signal S(1,0) and velocity response signal S(0,1) shown in FIGS. 5 and 6.

In general, the third settle algorithm comprises the following steps. First, the combined response of various combinations of possible position error signals PES and velocity error signals PES_V are generated based on the position response S(1,0) and velocity response S(0,1) signals. Second, the peak values of each combination are stored in the memory device 162. Third, the peak values associated with a given initial position error signal PES and initial velocity estimate signal PES_v are read and compared with the predicted maximum stroke of the second stage 132. Based on this comparison, the second stage 132 is either left deactivated or reactivated to assist with the settle phase of the seek operation.

More specifically, the third settle algorithm operates in a pre-seek mode and in a settle mode. The pre-seek computation mode may be summarized by the following equations E3-1, E3-2, and E3-3:

$$S(1,\beta_i)=S(1,0)+\beta_i*S(0,1); \quad \text{(E3-1)}$$

$$S_i^+\text{max}=\max(S(1,\beta_i)); \text{ and} \quad \text{(E3-2)}$$

$$S_i^-\text{max}=\min(S(1,\beta_i)); \text{ where} \quad \text{(E3-3)}=$$

$\beta=PES\_v/PES;$ $i=1:N;$

N=table length;

$1 \geq \beta_i \geq -1;$ and $2*N$=memory space.

N values of $S_i^+$ max and $S_i^-$ max for i=1: N are thus stored in the memory spaced defined by the memory device 162. The pre-seek computation process may be performed any time prior to the seek operation and is typically performed off-line. The value $\beta_i$ functions as an index that allows the settle control system 124 to access the appropriate values $S_i^+$ max and $S_i^-$ max during the seek operation.

In particular, when the seek process is initiated, the third settle algorithm operates according to the following equations E3-4 and E3-5:

$$S^+(PES,PES\_v)\text{max}=PES*S^+\text{max}(1,\beta_i), \quad \text{(E3-4)}$$

$$S^-(PES,PES\_v)\text{max}=PES*S^-\text{max}(1,\beta_i), \text{ where} \quad \text{(E3-5)}$$

$\beta$ is rounded to the nearest $\beta_i$.

The following table is an example that may be used by the third settle algorithm to generate the values $S^+(PES,PES\_v)$max and $S^-(PES,PES\_v)$max.

|  |  | $S^+$max | $S^-$max |
|---|---|---|---|
| $S(1, \beta_1)$ | $S(1,-1.0)$max | v1 | v2 |
| $S(1, \beta_2)$ | $S(1,-0.9)$max | v3 | v4 |
| $S(1, \beta_3)$ | $S(1,-0.8)$max | v5 | v6 |
| $S(1, \beta_4)$ | $S(1,-0.7)$max | v7 | v8 |
| $S(1, \beta_5)$ | $S(1,-0.6)$max | v9 | v10 |
| $S(1, \beta_6)$ | $S(1,-0.5)$max | v11 | v12 |
| $S(1, \beta_7)$ | $S(1,-0.4)$max | v13 | v14 |
| $S(1, \beta_8)$ | $S(1,-0.3)$max | v15 | v16 |
| $S(1, \beta_9)$ | $S(1,-0.2)$max | v17 | v18 |
| $S(1, \beta_{10})$ | $S(1,-0.1)$max | v19 | v20 |
| $S(1, \beta_{11})$ | $S(1,-0.0)$max | v21 | v22 |
| $S(1, \beta_{12})$ | $S(1,0.1)$max | v23 | v24 |
| $S(1, \beta_{13})$ | $S(1,0.2)$max | v25 | v26 |
| $S(1, \beta_{14})$ | $S(1,0.3)$max | v27 | v28 |
| $S(1, \beta_{15})$ | $S(1,0.4)$max | v29 | v30 |
| $S(1, \beta_{16})$ | $S(1,0.5)$max | v31 | v32 |
| $S(1, \beta_{17})$ | $S(1,0.6)$max | v33 | v34 |
| $S(1, \beta_{18})$ | $S(1,0.7)$max | v35 | v36 |
| $S(1, \beta_{19})$ | $S(1,0.8)$max | v37 | v38 |
| $S(1, \beta_{20})$ | $S(1,0.9)$max | v39 | v40 |
| $S(1, \beta_{21})$ | $S(1,1.0)$max | v41 | v42 |

In the foregoing example table, the odd values v1–v41 represent the positive maximum values of a curve resulting from combination of the position and velocity responses, while the even values v2–v42 represent negative maximum values of a curve resulting from the combination of the position and velocity responses. In the example table, only one index β is employed to access the position and response values because the elements on the same diagonal line (e.g., S(0.1,0.1), S(0.2, 0.2) . . . S(α, α) . . . (S(1.0, 1.0)) may be consolidated into the single table element αS(1, 0.5).

In the example table set forth above, if β=0.92, that number is rounded to the closest $β_i$, or in this case $β_{20}$. The values v39 and v40 associated with $β_{20}$ are thus substituted for the expressions $S^+max(1,β)$ and $S^-max(1,β)$ in equations E3-4 and E3-5.

In any event, once the appropriate values are obtained, the comparator 170 turns on the second stage 132 according to the following conditional statement (CS3):

if $|S^+(PES,PES\_v)max+uO^+|<umax$, and if $|S^-(PES,PES\_v)max+uO^-|<umax$, then        (CS3)

activate the second stage 132.

The conditional statement CS3 represents a comparison of predicted maximum stroke required with available stroke. The steps associated with equations E34 and E3-5 and conditional statement CS3 are repeated from the time the seek operation is initiated and the second stage actuator is deactivated until the second stage 132 is reactivated.

Figure 7:
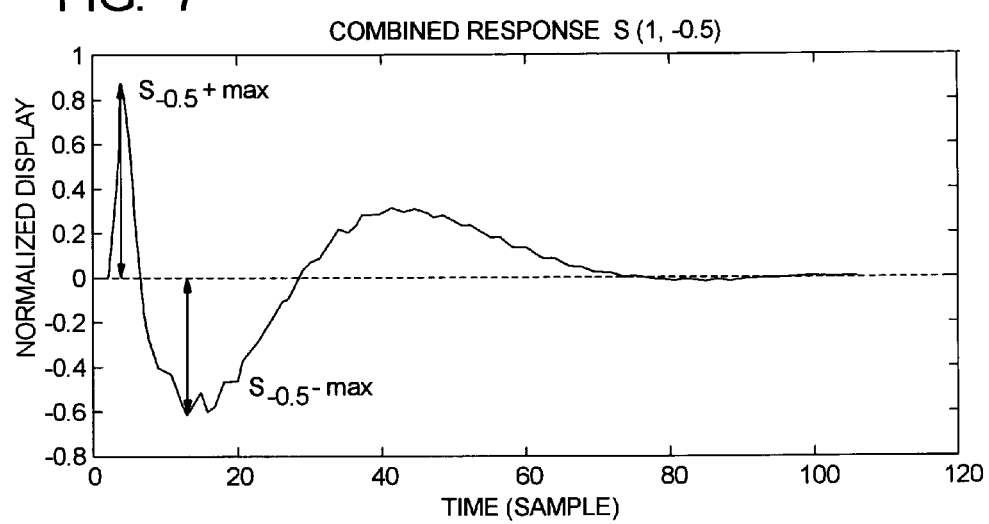
FIG. 7 is a plot of the combined velocity and position responses generated by the system of FIG. 4 based on the pre-calculated velocity and position responses of FIGS. 5 and 6.

An example of the combined response used by the third settle algorithm is shown in FIG. 7. FIG. 7 illustrates that the normalized maximums $S^+max$ and $S^-max$ of the combined response can be less than one. The third settle algorithm is more accurate and less conservative than the first and second settle algorithms discussed above and, thus, reactivates the second stage 132 sooner than either of the first and second settle algorithms.

As briefly described above, the settle algorithms described herein are examples only, and other settle algorithms may be used within the scope of the present invention. For example, for a particular servo system, the designer may decide that one or the other of the velocity and position responses is dominant and may generate Smax based only on the dominant response.

Alternatively, the designer may alter one of the settle algorithms above. If the value Smax is calculated using the first settle algorithm, Smax may be multiplied by a factor of less than one to obtain a value that is less conservative.

In the settle algorithms described herein, the initial offset uO of the second stage actuator is taken into account by the conditional statements CS1, CS2, or CS3 implemented by the comparator 170. In any one of the settle algorithms, the second stage 132 may be reset at the time the seek operation is initiated. If the second stage 132 is reset, the initial offset uO will be zero. Abruptly resetting the second stage 132 to zero can, in some cases, introduce instabilities into the servo system 122.

Alternatively, instead of simply resetting the second stage 132, the initial offset uO may be gradually reduced to zero during the seek operation. Gradually reducing the initial offset uO to zero eliminates the contribution of the initial offset uO to the actual position signal uA of the second stage 132 while reducing or eliminating system instabilities caused by abruptly resetting the second stage 132.

If the second stage 132 is not reset at the beginning of the seek operation, the actual position signal uA of the second stage actuator comprises a component contributed by the initial offset uO. The term discharge portion uD will be used herein to refer to the component of the actual position signal uA contributed by the initial offset uO at any point during the seek operation.

Figure 8:
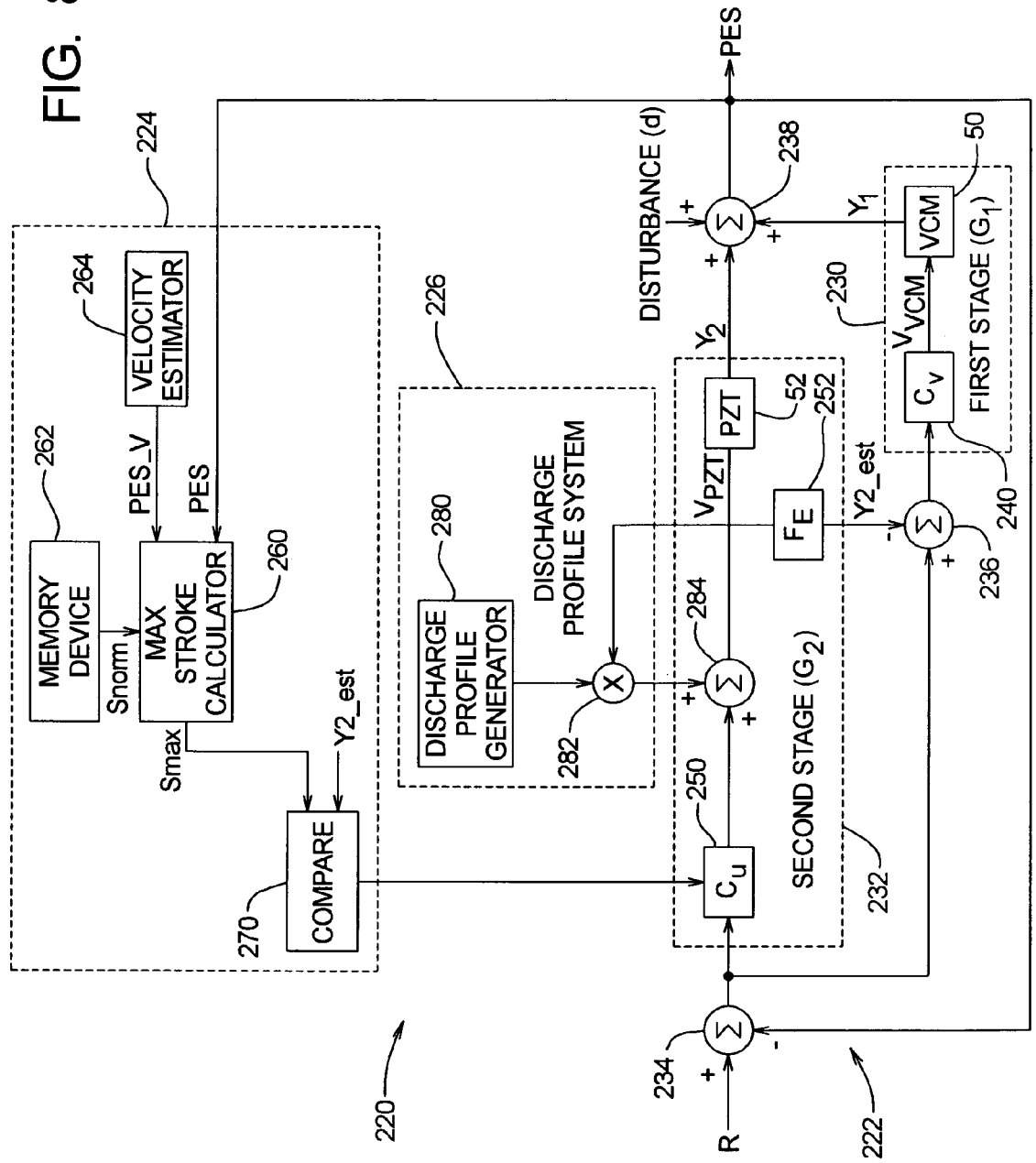
FIG. 8 is a block diagram depicting another embodiment of a dual-stage actuator of a hard drive including a discharge profile system and a settle control system of the present invention.

Referring to FIG. 8, illustrated therein is an actuator control system 220 constructed in accordance with, and embodying, the principles of another embodiment of the present invention. The actuator control system 220 is designed to gradually reduce the discharge portion uD of the actual offset uA to zero.

In particular, the actuator control system 220 comprises a servo system 222, a settle control system 224, and a discharge profile system 226. The actuator control system 220 forms part of a two-stage actuator system similar to the two-stage actuator system formed by the servo system 60 described above. The discharge profile system 226 eliminates, according to a predetermined discharge profile, the discharge portion uD of the actual position signal uA associated with the second stage actuator 232.

The servo system 222 comprises a first stage 230, a second stage 232, and first, second, and third summers 234, 236, and 238. The first stage 230 comprises a first control circuit 240 and the first transducer 50 described above. The second stage 232 comprises a second control circuit 250, an estimator circuit 252, and the second transducer 52 described above. The settle control system 224 comprises a maximum stroke calculator 260, a memory device 262, and a velocity estimator 264. One of ordinary skill in the art will recognize that the first and second stages 230 and 232 form first and second servo loops.

Figure 1:
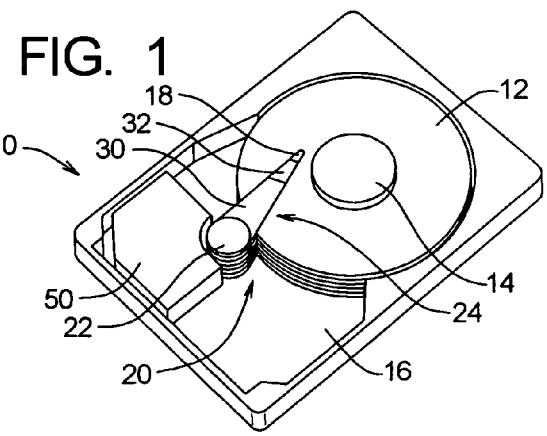
FIG. 1 is a perspective view of a hard disk drive.
Figure 2:
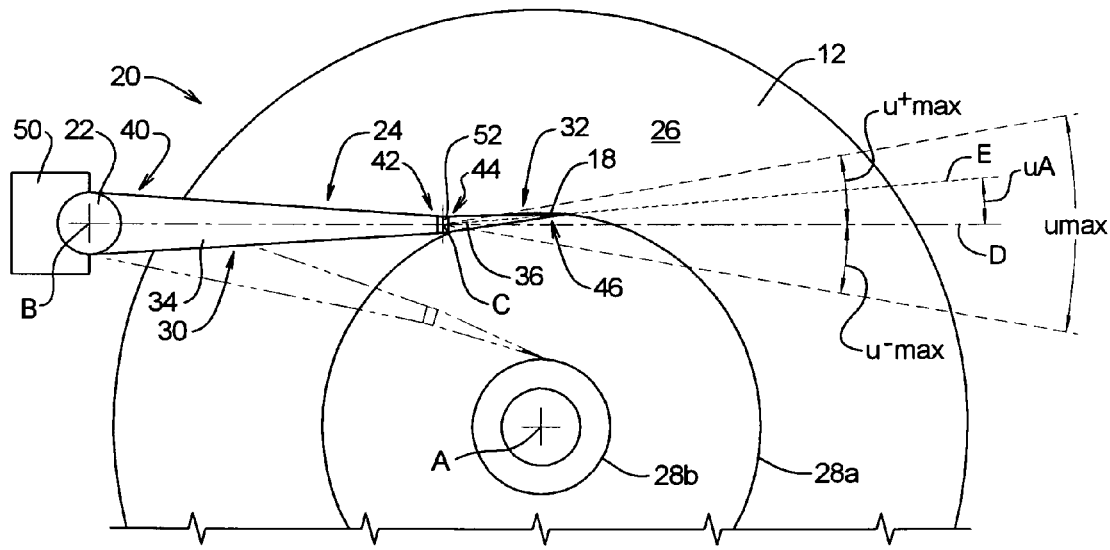
FIG. 2 is a schematic representation of the positioning system of the disk drive of FIG. 1.
Figure 3:
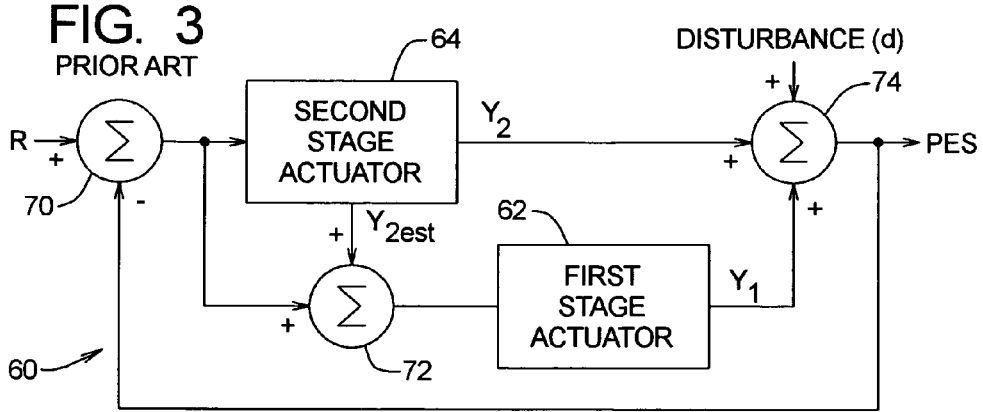
FIG. 3 is a block diagram depicting a conventional servo system of a hard disk drive having a dual-stage actuator.

The servo system 222 and settle control system 224 operate in the same basic manner as the servo system 122 and settle control system 124 described above. The details of construction and operation of the servo system 222 and the settle control system 224 thus will not be repeated below. The signal names and description used in connection with FIGS. 3 and 4 will also be used in connection with FIG. 8.

The discharge profile system 226 modifies the output of the second control circuit 250 during the seek operation based on a predetermined discharge profile. The discharge profile gradually reduces the output of the second control circuit 250 until the discharge portion uD of the initial offset uO to the actual position signal uA of the second stage actuator 232 is gradually eliminated.

In particular, the example discharge profile system 226 comprises a discharge profile generator 280, a multiplier 282, and a summer 284. The output of the discharge profile generator 280 is a discharge signal that represents the discharge profile. The discharge signal is multiplied by the control signal $V_{PZT}$ applied to the second transducer 52 and combined with the output of the control circuit 250. So connected, the discharge profile system 226 gradually reduces the discharge portion uD of the actual position signal uA during the seek operation.

Figure 9:
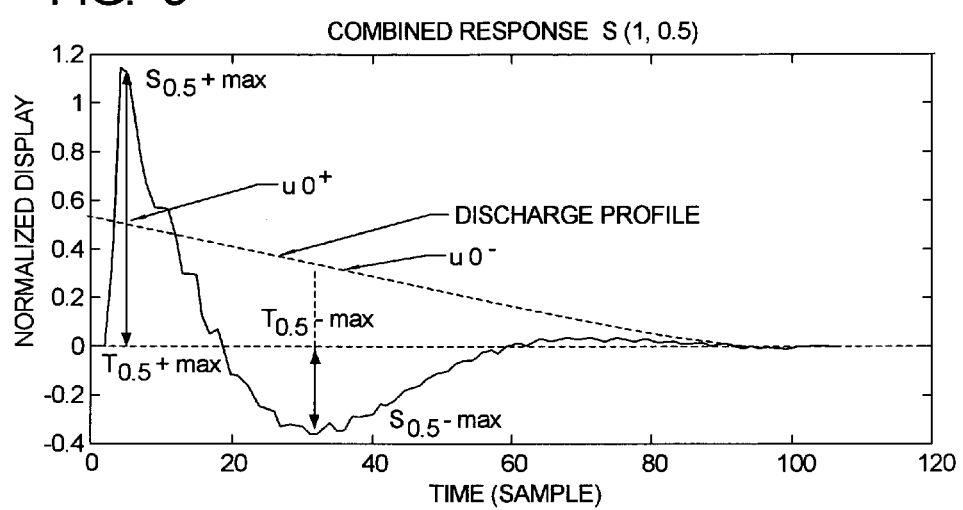
FIG. 9 is a plot of the combined velocity and position responses generated by the system of FIG. 8 based on the pre-calculated velocity and position responses of FIGS. 5 and 6 and a pre-calculated discharge profile.

FIG. 9 illustrates a combined response that results under one example set of initial conditions when a discharge profile system 226 is used to gradually reset the initial offset uO. Co-pending U.S. patent application Ser. No. 10/366, 544, which is incorporated herein by reference, discloses in detail at least one example of a discharge profile system that may be used as the discharge profile system 226.

The scope of the present invention should be determined with respect to the following claims and not the foregoing detailed description.

We claim:

1. An actuator control system for a hard disk drive comprising first and second actuators that support a head relative to a disk, comprising:

a first stage for displacing the first actuator relative to the disk;

a second stage for displacing the second actuator relative to the first actuator;

a memory device for storing at least one data value indicative of a predicted response of the second stage; and a maximum stroke calculator for generating a predicted maximum stroke based on the at least one data value stored by the memory device; whereby the second stage is deactivated when the disk drive initiates a seek operation; and the second stage is reactivated based on a comparison of the predicted maximum stroke with a position of the second actuator.

2. An actuator control system as recited in claim 1, in which the maximum stroke calculator generates the predicted maximum stroke further based on at least one signal associated with the actuator control system.

3. An actuator control system as recited in claim 1, in which the maximum stroke calculator generates the predicted maximum stroke further based on:

a position error signal; and a velocity estimate signal.

4. An actuator control system as recited in claim 1, in which the predicted response of the second stage is based on a pre-calculated position response of the second stage.

5. An actuator control system as recited in claim 1, in which the predicted response of the second stage is based on a pre-calculated velocity response of the second stage.

6. An actuator control system as recited in claim 1, in which the predicted response of the second stage is based on:

a pre-calculated position response of the second stage; and a pre-calculated velocity response of the second stage.

7. An actuator control system as recited in claim 1, in which the maximum stroke calculator generates the predicted maximum stroke based on:

a combination of a position error signal and a pre-calculated position response of the second stage; and a combination of a velocity estimate signal and a pre-calculated velocity response of the second stage.

8. An actuator control system as recited in claim 1, in which the memory device stores a plurality of values indicative of a predicted response of the second stage.

9. An actuator control system as recited in claim 1, in which the memory device stores at least one positive value and at least one negative value indicative of a predicted response of the second stage.

10. An actuator control system as recited in claim 1, in which the memory device stores at least one positive value and at least one negative value pre-calculated based on a predicted position response and a predicted velocity response of the second stage.

11. An actuator control system as recited in claim 1, in which the memory device stores:

a first positive value pre-calculated based on the maximum in a positive direction of the predicted position response;

a second positive value pre-calculated based on the maximum in a positive direction of the predicted velocity response;

a first negative value pre-calculated based on the maximum in a negative direction of the predicted position response; and a second negative value pre-calculated based on the maximum in a negative direction of the predicted velocity response.

12. An actuator control system as recited in claim 11, in which the maximum stroke calculator generates the predicted maximum stroke based on:

a first product of a position error signal and the first positive value;

a second product of a velocity estimate signal and the second positive value;

a third product of the position error signal and the first negative value; and a fourth product of the velocity estimate signal and the second negative value.

13. An actuator control system as recited in claim 12, in which the maximum stroke calculator generates the predicted maximum stroke based on:

a first sum of the absolute values of the first and second products; and a second sum of the absolute values of the second and third products.

14. An actuator control system as recited in claim 12, in which the maximum stroke calculator generates the predicted maximum stroke based on:

a first square root of a sum of squares of the absolute values of the first and second products; and a second square root of a sum of squares of the absolute values of the third and fourth products.

15. An actuator control system as recited in claim 1, in which the memory device stores a table comprising:

a plurality of positive values; and a plurality of negative values; wherein the positive and negative values are pre-calculated based on predetermined combinations of the predicted position response and the predicted velocity response.

16. An actuator control system as recited in claim 15, further comprising an index for accessing the table based on the predetermined combinations of the predicted position response and the predicted velocity response.

17. An actuator control system as recited in claim 16, in which the values stored in the table are accessed based on the index.

18. An actuator control system as recited in claim 15, in which the values stored in the table are accessed based on a relationship of the position error signal and the velocity estimate signal.

19. A hard disk drive comprising:

first and second actuators that support a head relative to a disk, comprising:

a first stage for displacing the first actuator relative to the disk;

a second stage for displacing the second actuator relative to the first actuator;

a memory device for storing at least one data value indicative of a predicted response of the second stage to a seek operation; and a maximum stroke calculator for generating a predicted maximum stroke based on the at least one data value stored by the memory device; whereby the second stage is deactivated when the disk drive initiates a seek operation; and the second stage is reactivated based on a comparison of the predicted maximum stroke with a position of the second actuator.

20. A hard disk drive as recited in claim 19, in which the maximum stroke calculator generates the predicted maximum stroke further based on at least one signal associated with the actuator control system.

21. A hard disk drive as recited in claim 19, in which the maximum stroke calculator generates the predicted maximum stroke further based on:
   a position error signal; and
   a velocity estimate signal.

22. A hard disk drive as recited in claim 19, in which the predicted response of the second stage is based on a pre-calculated position response of the second stage.

23. A hard disk drive as recited in claim 19, in which the predicted response of the second stage is based on a pre-calculated velocity response of the second stage.

24. A hard disk drive as recited in claim 19, in which the predicted response of the second stage is based on:
   a pre-calculated position response of the second stage; and
   a pre-calculated velocity response of the second stage.

25. A hard disk drive as recited in claim 19, in which the maximum stroke calculator generates the predicted maximum stroke based on:
   a combination of a position error signal and a pre-calculated position response of the second stage; and
   a combination of a velocity estimate signal and a pre-calculated velocity response of the second stage.

26. A hard disk drive as recited in claim 19, in which the memory device stores a plurality of values indicative of a predicted response of the second stage.

27. A hard disk drive as recited in claim 19, in which the memory device stores at least one positive value and at least one negative value indicative of a predicted response of the second stage.

28. A hard disk drive as recited in claim 19, in which the memory device stores at least one positive value and at least one negative value pre-calculated based on a predicted position response and a predicted velocity response of the second stage.

29. A hard disk drive as recited in claim 19, in which the memory device stores:
   a first positive value pre-calculated based on the maximum in a positive direction of the predicted position response;
   a second positive value pre-calculated based on the maximum in a positive direction of the predicted velocity response;
   a first negative value pre-calculated based on the maximum in a negative direction of the predicted position response; and
   a second negative value pre-calculated based on the maximum in a negative direction of the predicted velocity response.

30. A hard disk drive as recited in claim 29, in which the maximum stroke calculator generates the predicted maximum stroke based on:
   a first product of a position error signal and the first positive value;
   a second product of a velocity estimate signal and the second positive value;
   a third product of the position error signal and the first negative value; and
   a fourth product of the velocity estimate signal and the second negative value.

31. A hard disk drive as recited in claim 30, in which the maximum stroke calculator generates the predicted maximum stroke based on:
   a first sum of the absolute values of the first and second products; and
   a second sum of the absolute values of the second and third products.

32. A hard disk drive as recited in claim 30, in which the maximum stroke calculator generates the predicted maximum stroke based on:
   a first square root of a sum of squares of the absolute values of the first and second products; and
   a second square root of a sum of squares of the absolute values of the third and fourth products.

33. A hard disk drive as recited in claim 19, in which the memory device stores a table comprising:
   a plurality of positive values; and
   a plurality of negative values; wherein the positive and negative values are pre-calculated based on predetermined combinations of the predicted position response and the predicted velocity response.

34. A hard disk drive as recited in claim 33, further comprising an index for accessing the table based on the predetermined combinations of the predicted position response and the predicted velocity response.

35. A hard disk drive as recited in claim 34, in which the values stored in the table are accessed based on the index.

36. A hard disk drive as recited in claim 33, in which the values stored in the table are accessed based on a relationship of the position error signal and the velocity estimate signal.

37. An actuator control system for a hard disk drive comprising first and second actuators that support a head relative to a disk, comprising:
   a first stage comprising voice coil motor for displacing the first actuator relative to the disk;
   a second stage comprising a piezo-electric transducer for displacing the second actuator relative to the first actuator;
   a memory device for storing at least one positive data value and at least one negative data value indicative of a predicted response of the second stage to a seek operation; and
   a maximum stroke calculator for generating a predicted maximum stroke based on the at least one positive data value and the at least one negative data value stored by the memory device; whereby
   the second stage is deactivated when the disk drive initiates a seek operation; and
   the second stage is reactivated based on a comparison of the predicted maximum stroke with a position of the piezo-electric transducer relative to the first actuator.

38. An actuator control system as recited in claim 37, in which the maximum stroke calculator generates the predicted maximum stroke further based on at least one signal associated with the actuator control system.

39. An actuator control system as recited in claim 37, in which the maximum stroke calculator generates the predicted maximum stroke further based on:
   a position error signal; and
   a velocity estimate signal.

40. An actuator control system as recited in claim 37, in which the predicted response of the second stage is based on a pre-calculated position response of the second stage.

41. An actuator control system as recited in claim 37, in which the predicted response of the second stage is based on a pre-calculated velocity response of the second stage.

42. An actuator control system as recited in claim 37, in which the predicted response of the second stage is based on:
   a pre-calculated position response of the second stage; and
   a pre-calculated velocity response of the second stage.

43. An actuator control system as recited in claim 37, in which the memory device stores at least one positive value and at least one negative value pre-calculated based on a predicted position response and a predicted velocity response of the second stage.

44. An actuator control system as recited in claim 37, in which the memory device stores:
   a first positive value pre-calculated based on the maximum in a positive direction of the predicted position response;
   a second positive value pre-calculated based on the maximum in a positive direction of the predicted velocity response;
   a first negative value pre-calculated based on the maximum in a negative direction of the predicted position response; and
   a second negative value pre-calculated based on the maximum in a negative direction of the predicted velocity response.

45. An actuator control system as recited in claim 44, in which the maximum stroke calculator generates the predicted maximum stroke based on:
   a first product of a position error signal and the first positive value;
   a second product of a velocity estimate signal and the second positive value;
   a third product of the position error signal and the first negative value; and
   a fourth product of the velocity estimate signal and the second negative value.

46. An actuator control system as recited in claim 45, in which the maximum stroke calculator generates the predicted maximum stroke based on:
   a first sum of the absolute values of the first and second products; and
   a second sum of the absolute values of the second and third products.

47. An actuator control system as recited in claim 45, in which the maximum stroke calculator generates the predicted maximum stroke based on:
   a first square root of a sum of squares of the absolute values of the first and second products; and
   a second square root of a sum of squares of the absolute values of the third and fourth products.

48. An actuator control system as recited in claim 37, in which the memory device stores a table comprising:
   a plurality of positive values; and
   a plurality of negative values; wherein the positive and negative values are pre-calculated based on predetermined combinations of the predicted position response and the predicted velocity response.

49. An actuator control system as recited in claim 48, further comprising an index for accessing the table based on the predetermined combinations of the predicted position response and the predicted velocity response.

50. An actuator control system as recited in claim 49, in which the values stored in the table are accessed based on the index.

51. An actuator control system as recited in claim 48, in which the values stored in the table are accessed based on a relationship of the position error signal and the velocity estimate signal.

52. A method of displacing first and second actuators supporting a head of a disk of a hard drive comprising the steps of:
   providing a first stage for displacing the first actuator relative to the disk;
   providing a second stage for displacing the second actuator relative to the first actuator;
   storing at least one data value indicative of a predicted response of the second stage to a seek operation;
   generating a predicted maximum stroke based on the at least stored one data value;
   deactivating the second stage when the disk drive initiates a seek operation; and
   reactivating the second stage based on a comparison of the predicted maximum stroke with a position of the second actuator.

53. A method as recited in claim 52, in which the predicted maximum stroke is further generated based on at least one signal associated with the actuator control system.

54. A method as recited in claim 52, in which the predicted maximum stroke is further generated based on:
   a position error signal; and
   a velocity estimate signal.

55. A method as recited in claim 52, in which the predicted response of the second stage is generated based on a pre-calculated position response of the second stage.

56. A method as recited in claim 52, in which the predicted response of the second stage is generated based on a pre-calculated velocity response of the second stage.

57. A method as recited in claim 52, in which the predicted response of the second stage is generated based on:
   a pre-calculated position response of the second stage; and
   a pre-calculated velocity response of the second stage.

58. A method as recited in claim 52, in which the predicted maximum stroke is generated based on:
   a combination of a position error signal and a pre-calculated position response of the second stage; and
   a combination of a velocity estimate signal and a pre-calculated velocity response of the second stage.

59. A method as recited in claim 52, in which the step of storing at least one value indicative of a predicted response of the second stage comprises the step of storing a plurality of values indicative of a predicted response of the second stage.

60. A method as recited in claim 52, in which the step of storing at least one value indicative of a predicted response of the second stage comprises the steps of storing at least one positive value and at least one negative value indicative of a predicted response of the second stage.

61. A method as recited in claim 52, in which the step of storing at least one value indicative of a predicted response of the second stage comprises the steps of storing at least one positive value and at least one negative value pre-calculated based on a predicted position response and a predicted velocity response of the second stage.

62. A method as recited in claim 52, in which the step of storing at least one value indicative of a predicted response of the second stage comprises the steps of storing:
   a first positive value pre-calculated based on the maximum in a positive direction of the predicted position response;
   a second positive value pre-calculated based on the maximum in a positive direction of the predicted velocity response;
   a first negative value pre-calculated based on the maximum in a negative direction of the predicted position response; and
   a second negative value pre-calculated based on the maximum in a negative direction of the predicted velocity response.

63. A method as recited in claim 62, in which the step of generating the predicted maximum stroke comprises the steps of:

calculating a first product of a position error signal and the first positive value;

calculating a second product of a velocity estimate signal and the second positive value;

calculating a third product of the position error signal and the first negative value; and calculating a fourth product of the velocity estimate signal and the second negative value.

64. A method as recited in claim 63, in which the step of generating the predicted maximum stroke comprises the steps of:

calculating a first sum of the absolute values of the first and second products; and calculating a second sum of the absolute values of the second and third products.

65. A method as recited in claim 61, in which step of generating the predicted maximum stroke comprises the steps of:

calculating a first square root of a sum of squares of the absolute values of the first and second products; and calculating a second square root of a sum of squares of the absolute values of the third and fourth products.

66. A method as recited in claim 52, further comprising the step of storing a table comprising the steps of:

pre-calculating a plurality of positive values based on predetermined combinations of the predicted position response and the predicted velocity response;

pre-calculating a plurality of negative values based on the predetermined combinations of the predicted position response and the predicted velocity response; and storing the positive and negative values.

67. A method as recited in claim 66, further comprising the step of generating an index for accessing the table based on the predetermined combinations of the predicted position response and the predicted velocity response.

68. A method as recited in claim 67, further comprising the step of accessing the values stored in the table based on the index.

69. A method as recited in claim 66, further comprising the step of accessing the values stored in the table based on a relationship of the position error signal and the velocity estimate signal.

* * * * *